Feb. 11, 1930. H. A. KESSLER 1,747,138
PRODUCTION OF EXPANDED LOAD BEARING MEMBERS
Filed April 5, 1927  5 Sheets-Sheet 1
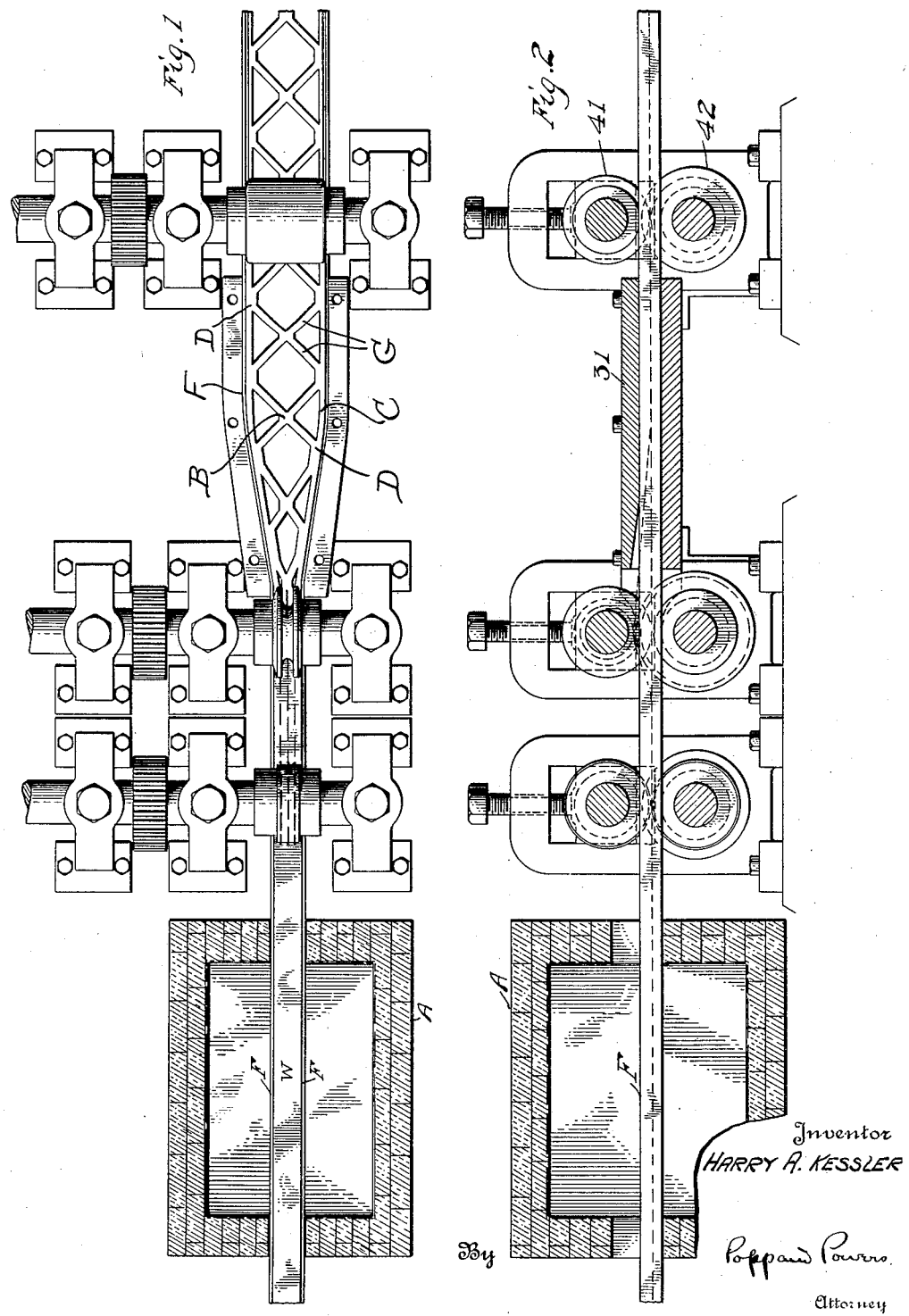
Inventor
HARRY A. KESSLER
By Poppand Powers
Attorney Feb. 11, 1930.  H. A. KESSLER  1,747,138
PRODUCTION OF EXPANDED LOAD BEARING MEMBERS
Filed April 5, 1927   5 Sheets-Sheet 2
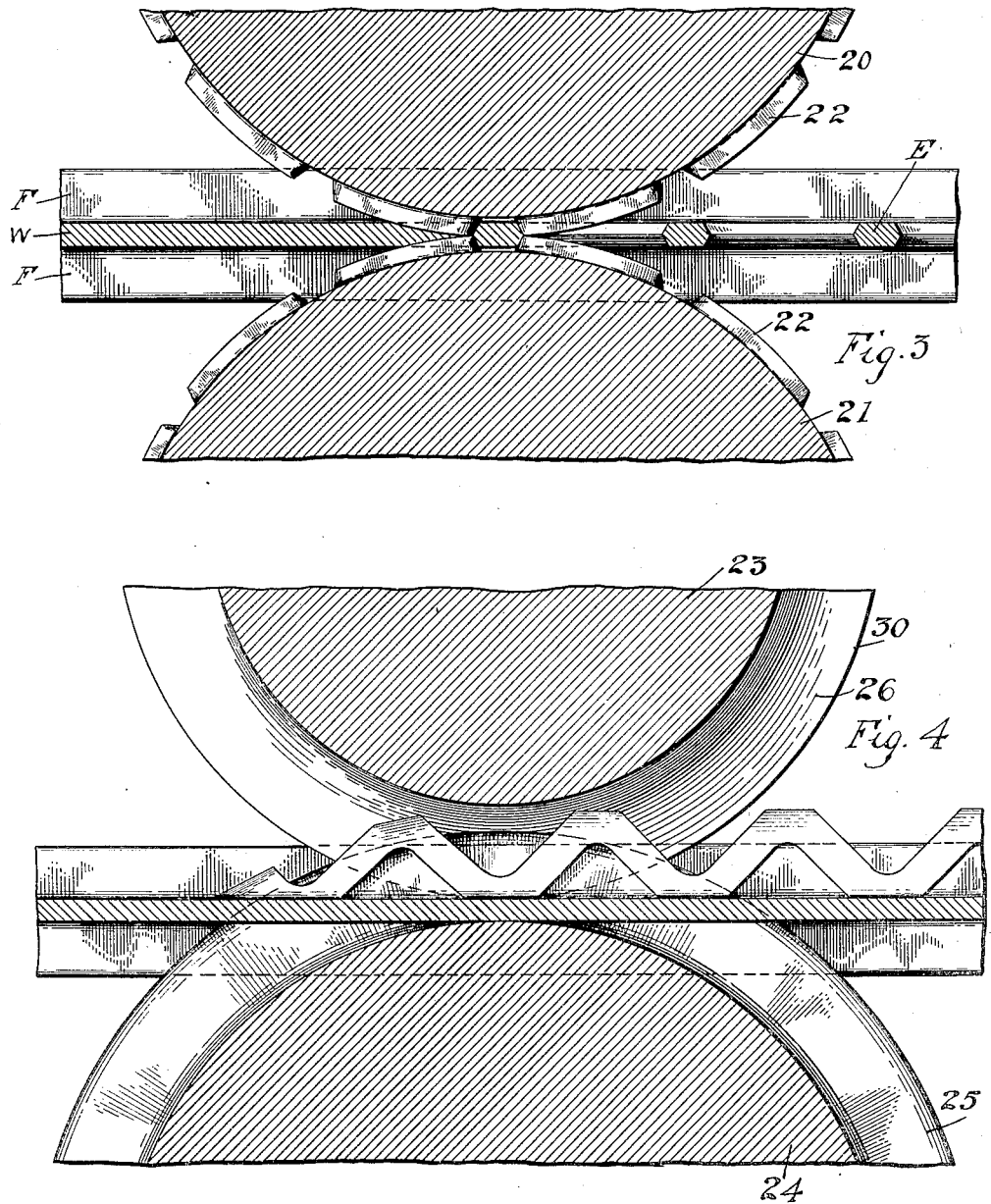
Inventor
HARRY A. KESSLER
By  Popp and Powers
Attorney Feb. 11, 1930.  H. A. KESSLER  1,747,138
PRODUCTION OF EXPANDED LOAD BEARING MEMBERS
Filed April 5, 1927  5 Sheets-Sheet 3
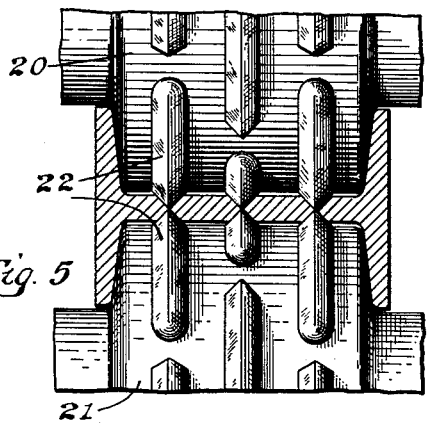
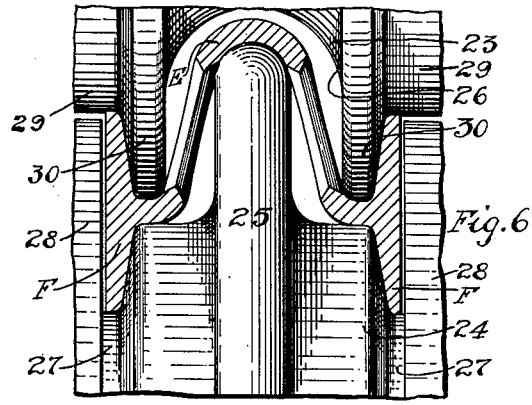
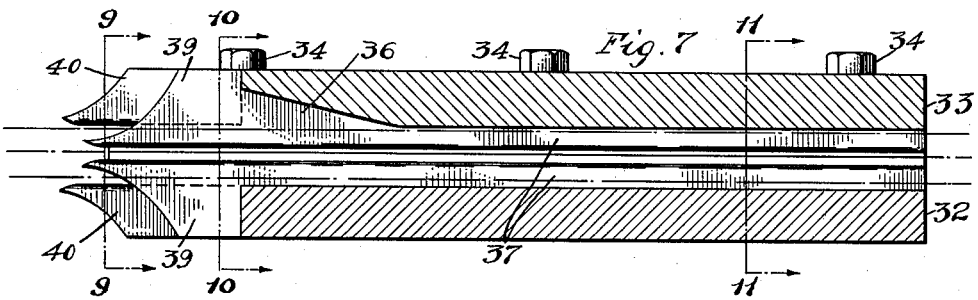
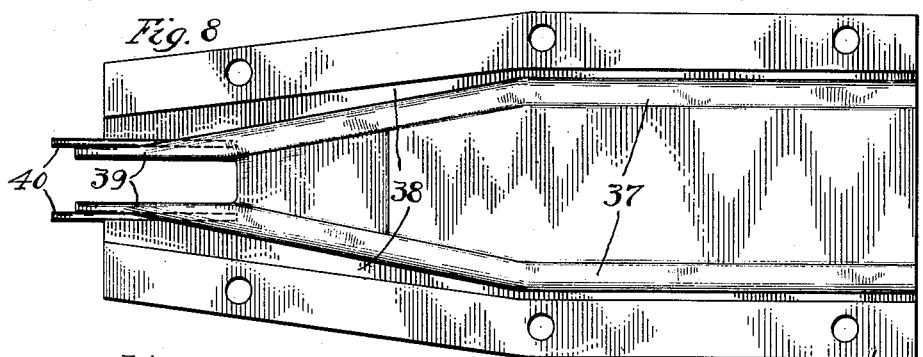
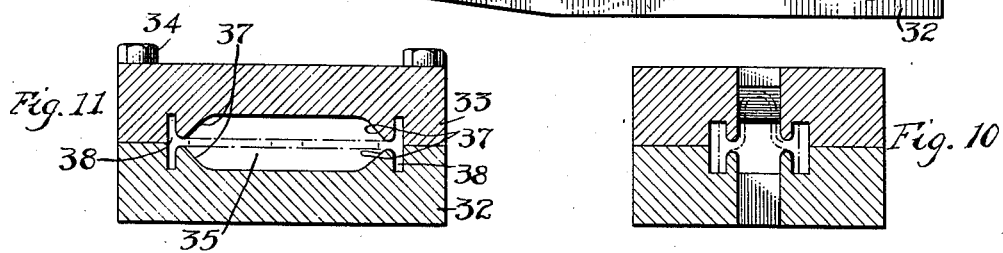
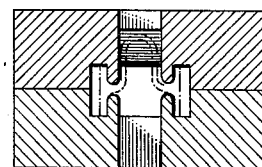
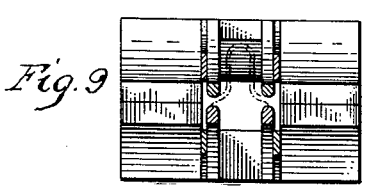
Inventor
HARRY A. KESSLER
By Popp and Powers
Attorneys Feb. 11, 1930.  H. A. KESSLER  1,747,138
PRODUCTION OF EXPANDED LOAD BEARING MEMBERS
Filed April 5, 1927  5 Sheets-Sheet 4

Inventor
HARRY A. KESSLER
By Popp and Powers
Attorney

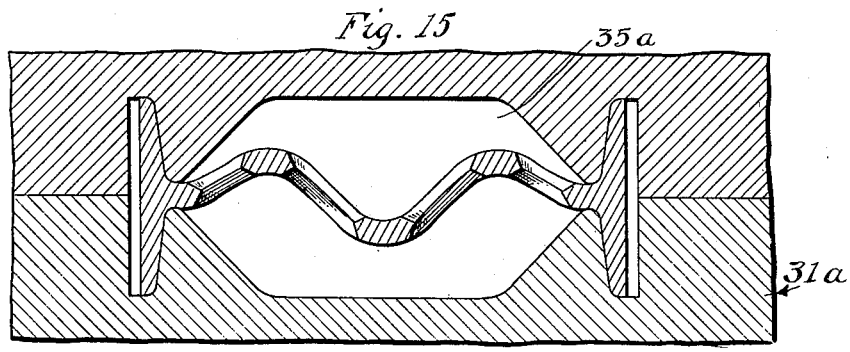
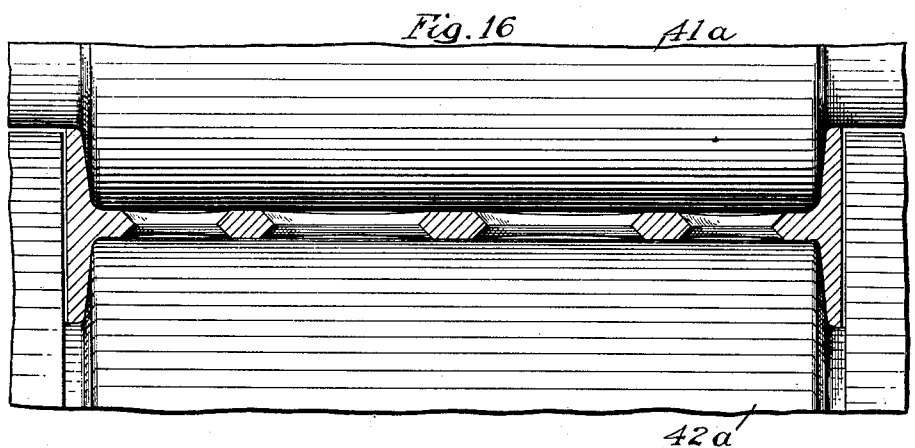
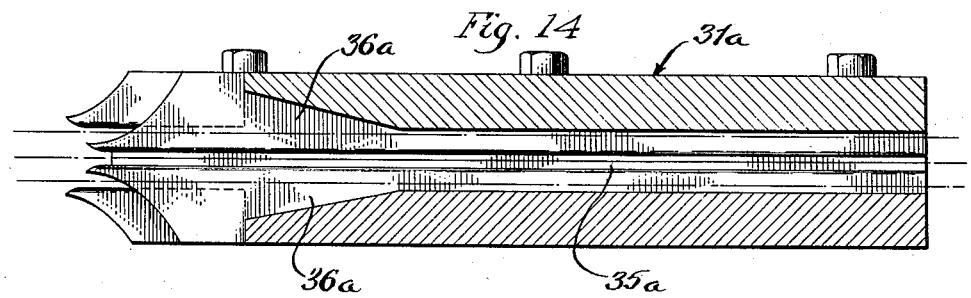

Patented Feb. 11, 1930

1,747,138

UNITED STATES PATENT OFFICE

HARRY A. KESSLER, OF BUFFALO, NEW YORK, ASSIGNOR TO KALMAN STEEL COMPANY, INC., OF CHICAGO, ILLINOIS, A CORPORATION OF DELAWARE

PRODUCTION OF EXPANDED LOAD-BEARING MEMBERS

Application filed April 5, 1927. Serial No. 181,201.

This invention relates to the production of expanded load bearing members and its object is to provide a method of simple character, which may be practiced rapidly and economically and which results in a product of superior quality expanded from a rolled blank.

Apparatus for practicing the method is illustrated in the accompanying drawings in which:

Figure 1 is a plan view of the apparatus, the upper member of the expansion guide being removed.

Figure 2 is a central longitudinal sectional view.

Figure 3 is a longitudinal sectional view of the rolls by which the blank is slitted.

Figure 4 is a longitudinal sectional view of the rolls by which the blank is expanded.

Figure 5 is a partial elevation of the rolls by which the blank is slitted, the blank being shown at the center of the roll pass.

Figure 6 is a partial elevation of the rolls by which the blank is expanded, the blank being shown at the center of the roll pass.

Figure 7 is a longitudinal sectional view of the expansion guide.

Figure 8 is a plan view of the lower member of the expansion guide.

Figures 9, 10 and 11 are cross sections on the lines 9—9, 10—10 and 11—11 of Figure 7.

Figure 12:
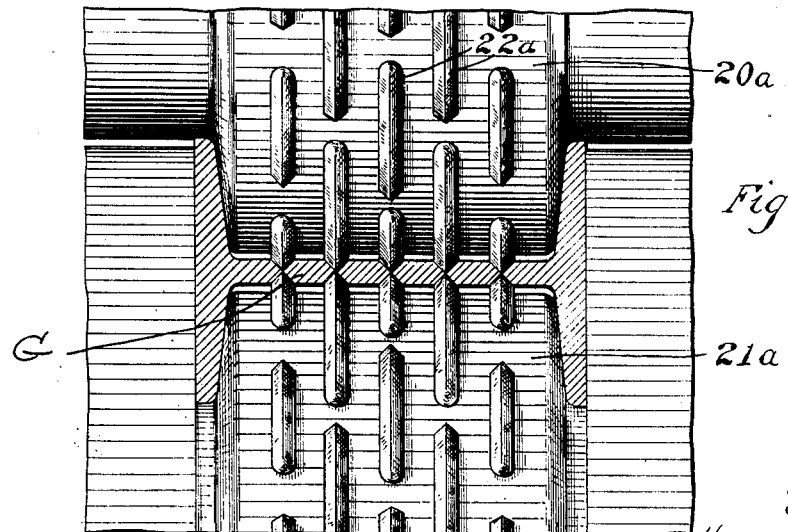

Figure 12 is a partial elevation of the rolls employed to slit the blank where it is desired that the product shall have several rows of intermediate bonds, the blank being shown at the center of the roll pass.

Figure 13:
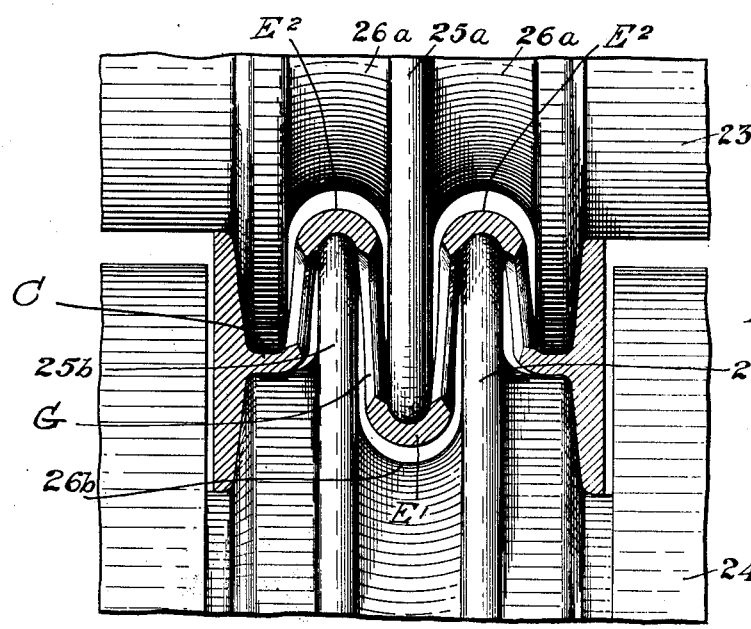

Figure 13 is a partial elevation of the rolls for the expansion of the blank slitted by the rolls of Figure 12, the blank being shown at the center of the roll pass.

Figure 14 is a longitudinal sectional view of the expansion guide for the expanded blank delivered by the rolls shown in Figures 12 and 13.

Figure 15 is a cross sectional view of the expansion guide of Figure 14, showing a stage in the alteration of the expanded web to a flat cross section.

Figure 16 is a partial elevation of the finishing rolls to which the blank passes from the expansion guide shown in Figures 14 and 15, the blank being shown at the center of the roll pass.

The blank is rolled in the usual manner to a suitable I-cross section whereby a web W and flanges F are provided and the process is practiced with the blank at a working heat of about 1600° F. The blank may be passed directly from the mill by which it is rolled to the apparatus by which it is expanded in which case no reheating is ordinarily necessary; or if it has been allowed to cool before its delivery to the apparatus for its expansion it may be reheated in a furnace A from which it is passed to the expansion apparatus. As herein shown the blank is passed to the furnace A in the direction of its length.

The web of the blank is first formed with longitudinal slits arranged in the manner suitable for diamond mesh expansion. These slits, however, are not formed by the ordinary shearing cutters but by upper and lower rolls 20 and 21 provided with peripheral rows of co-incidentally arranged scoring ribs 22 by which the web is penetrated and the slits are formed without the displacement of any of the intervening parts from the plane of the web, the rolls being proportioned to provide suitable clearances at the bases of the ribs to accommodate the metal displaced on the strand surfaces by the penetration of the ribs. Such a manner of slitting the blank has the advantage of avoiding any incidental stretching of the portions by which the struts of the finished beam are provided and enables the expansion of the blank, without the necessity of any intervening step, by stretching each row of strands in a single locally complete operation such that the strands G (Figs. 1 and 12) are stretched uniformly at all points and by a subsequent separation of the flanges of the blank may be brought back into the plane with which the operation started, that is to say, the original plane of the web. As shown in Figures 1 and 5 the scoring rolls are formed to provide for three rows of slits whereby the expanded beam will have a single row of intermediate bonds B (Fig. 1).

From the slitting rolls constructed as above described the blank passes to a pair of expansion rolls 23 and 24. One of these rolls, in this instance the lower roll, is formed with a peripheral expansion rib 25 and the other roll is formed with a peripheral channel 26 in which the rib 25 operates, the walls of the channel being preferably so spaced from the rib as to be entirely out of contact with the blank. The rolls 23 and 24 are formed to guide the blank and hold against lateral pull all parts which are not engaged by the expansion rib but do not elongate the flanges F or the continuous web parts C attached thereto said flanges F and web parts C forming the chords of the completed beam. Thus the roll 24 is formed with shoulders 27 which carry the flanges F and with enlarged outer portions 28 which lie at the sides of said flanges and the roll 23 is formed with outer portions 29 which bear upon the flanges F at their upper sides. The body of the roll 24 carries the bonds of the outer row and the chord portions of the blank which adjoin the flanges F; and the roll 23 is formed with peripheral flanges 30 which lie at the inner sides of the flanges F and bear upon the bonds of the outer rows and the chord portions of the blank.

The expansion rib 25 has a regularly transversely curved crown portion which engages the bonds E of the intermediate row, bending them into arcuate cross section and pressing them from the plane of the blank, thereby to pull the strands of the adjacent rows into planes at an angle to one another and to the plane of the blank and in general tangential to the cross sectional curve of the bonds. As thus displaced the strands G of each row extend diagonally and lie flat in the inclined plane, and are uniformly stretched in the directions of their length and their common inclined plane, the stretching taking place between substantially unstretched bonds, that is to say the bonds which are engaged and held against lateral pull by the expansion rib and the bonds D of the outer rows which are held against lateral pull by the parts of the rolls between which they pass.

The stretching is completed as to each row of strands in a single operation. By this it is meant that the displacement and stretching of the strands may in a single operation be carried to the point of expansion desired for the finished beam, including expansion to any degree within a range which conforms to the requirements of sound engineering practice. The completely expanded web as it emerges from the stretching rolls has a curved or arched cross section such that upon the separation of the flanges it may be progressively brought back into the plane with which the operation started with the stretched strands and the associated bonds lying flat in such plane.

The separation of the flanges is preferably effected by the expansion guide 31 (Fig. 2) which may be of the construction shown in Figures 7 to 11. The expansion guide preferably consists of a lower member 32 and an upper member 33, these being secured together along their marginal portions by suitable bolt fastenings 34. The adjoining faces of the members 32 and 33 are formed with recesses to provide a chamber or clearance 35 for the web of the blank, this clearance being of greater depth at its front end, as at 36 (Figure 7) than through the rest of its length. The sides of the clearance 35 are provided by ribs 37 which engage the chord portions of the blank which chord portions include the flanges F and the continuous web parts C attached thereto. Beyond the ribs 37 the adjacent faces of the members 32 and 33 are recessed to provide clearances 38 for the flanges, the ribs 37 providing the inner sides of the clearances 38. The ribs 37 extend in divergent relation and at a suitably narrow angle from the front end of the expansion guide to points more or less at the center of the length of said guide and beyond such approximately central points extend in parallel relation as shown in Figure 8. The clearances 38 conform in direction and length of extent to the ribs 37. In their inclined portions the clearances 38 are of greater width than the thickness of the flanges F and gradually diminish in width toward the points where they commence to run parallel, at which points and for the rest of their extent their width is still slightly greater than the thickness of the flanges F. The spreading thrust is exerted against the flanges F by the ribs 37 and the width of the clearances 38 is such that the outer faces of the flanges F do not contact with the outer faces of the clearances, frictional resistance to the movement of the blank through the expansion guide being thereby minimized. The ribs 37 are suitably extended at their front ends, as at 39, beyond the body portions of the members 32 and 33 to engage the chord portions of the blank before the web enters the expansion guide and the rib extensions 39 are provided with shoes 40 which engage the upper and lower edges of the flanges F before the latter enter the clearances 38. The supporting engagement of the rib extensions 39 and shoes 40 with the blank commences immediately in front of the center of the pass of the expansion rolls 23 and 24 and insures the accurate introduction of the expanded blank into the guide 31.

The ribs 37 act on the flanges F to thrust them relatively laterally outward during the movement of the blank through the guide and as the flanges F are thus separated the expanded web is progressively altered in cross section from the arch-shape cross section as shown in Figures 6 and 9 to the flat cross section as shown in Figure 11. The flattening of the web is effected without substantial further stretching of the strands and is completed at the point at which the parallel extent of the flanges 37 and the clearances 38 commences; and during the further travel of the blank in the expansion guide any inequalities or local irregularities in the flanges are smoothed or ironed out while the flanges are also definitely set in parallel relation.

The blank on its emergence from the expansion guide passes between upper and lower finishing rolls 41 and 42 by which all irregularities on the surface of the expanded portion are reduced and the struts of the finished beam are set, the struts and the associated bonds lying flat in a common plane coincident with the plane with which the operation started.

The slitting, expansion and finishing rolls are positively driven and are available without further mechanism, for the feed of the blank through the apparatus.

The product is an integral expanded beam of the same length as the blank with which the operation started, there being no elongation of the flanges and chord portions and in which the struts are uniform in dimensions, are uniformly stretched and are substantially uniform in micro-structure and the bonds and panel points are substantially unstretched and are of their original thickness.

Referring to Figures 12 to 16: In the construction above described the blank was slitted in three longitudinal rows which resulted in an expanded beam having an intermediate row of bonds and two rows of strands, one between the intermediate row of bonds and each adjacent outer row of bonds or panel points. The invention is, however, available for beams which have several rows of bonds in addition to those which provide the panel points. Thus the slitting rolls $20^a$ and $21^a$ shown in Figure 12 and which otherwise resemble the rolls shown in Figure 5 are provided with five peripheral rows of co-incidentally arranged scoring ribs $22^a$ whereby the blank will have five longitudinal rows of slits. As a matter of preference the slits of the two outer rows are shorter than the remaining slits and this is sufficiently indicated by showing the scoring ribs $22^a$ of the two outer peripheral rows as shorter than the remaining ribs. The expansion rolls applicable to a blank having five longitudinal rows of slits are shown in Figure 13. One expansion roll, in this instance the upper roll $23^a$, is formed with a central expansion rib $25^a$ and with channels $26^a$ at each side of the rib and the other roll $24^a$ is formed with two expansion ribs $25^b$ which operate in the channels $26^a$ and with a central channel $26^b$ in which the expansion rib $25^a$ of the upper roll operates, the ribs $25^a$ and $25^b$ and channels $26^a$ and $26^b$ being similar in form and function to the rib 25 and the channel 26 previously described. During the passage of the blank through the expansion rolls the rib $25^a$ deflects, cross sectionally curves and holds against lateral pull the bonds $E^1$ of the central row and the ribs $25^b$ similarly operate on the bonds $E^2$ of the rows at each side of the central row, the rib $25^a$ deflecting the bonds $E^1$ from the plane of the web in a direction the reverse of the direction of the deflection of the bonds $E^2$ by the ribs $25^b$. The expansion rolls $23^a$ and $24^a$ otherwise cooperate with the flanges and chord portions of the blank in the manner described. It will be apparent that the deflection of the bonds $E^1$ and $E^2$ effects a simultaneous series of strand stretching operations which are singly locally complete as to each row of strands and that the expanded web as delivered by the expansion rolls has a sinuously curved cross section, that is to say a cross section composed of a series of reversely arranged connected arches, each similar in form to the arched cross section of the web as expanded by the rolls 23 and 24.

From the expansion rolls the blank passes to an expansion guide $31^a$ similar to that above described and shown in Figure 7 except that the clearance $35^a$ for the expanded web is deepened at its front end both above and below as at $36^a$ in order to conform to the sinuous cross section of the web on its emergence from the expansion rolls. The blank is shown in the course of its movement through the expansion guide in Figure 15. The expansion guide, of course, effects a complete alteration of the cross section of the web from the sinuous form shown in Figure 13 to the final flat form and on its emergence from the expansion guide the blank passes to finishing rolls $41^a$ and $42^a$ (Figure 16) which are similar to those described.

Having fully described my invention, I claim:

1. The method of producing an expanded load bearing member from a heated flanged blank having a web between the flanges which includes the steps of forming longitudinal rows of slits in the web by a scoring operation, the slits delimiting strands, and thereafter without increasing the length of the flanges and the continuous web parts attached thereto, so deflecting parts intermediate the strands from the original plane of the web and cross sectionally curving said parts while holding against lateral pull said deflected parts and the bonds to which the strands extend at their ends remote from the deflected parts that the strands are pulled into inclined planes in which they extend diagonally and lie flat and in a single locally complete operation are stretched in such planes in the directions of their extent.

2. The method of producing an expanded load bearing member from a heated flanged blank having a web between the flanges which consists in forming longitudinal rows of slits in the web by a scoring operation, the slits delimiting several rows of strands and rows of bonds between which the strands extend, thereupon without increasing the length of the flanges and the continuous web parts attached thereto holding the flanges and the bonds adjacent the flanges against lateral pull and so deflecting the remaining bonds simultaneously and in relatively opposite directions in alternate rows from the original plane of the web and cross sectionally curving the deflected bonds while holding them against lateral pull that the strands are pulled by rows into inclined planes in which they extend diagonally and lie flat and in simultaneous operations, singly locally complete as to each row of strands, are stretched in their planes in the direction of their extent, and thereafter increasing the mutual spacing of the flanges whereby to flatten the expanded web into the plane with which the operation started, the strands and associated bonds lying flat in such plane.

3. The method of producing an expanded load bearing member from a heated flanged blank having a web between the flanges which includes the steps of forming longitudinal rows of slits in the web by a scoring operation, the slits delimiting strands, and thereafter without increasing the length of the flanges and the continuous web parts attached thereto stretching the strands by a pulling operation applied thereto.

In testimony whereof I hereby affix my signature.

HARRY A. KESSLER.